(12) United States Patent
Koyasako et al.

(10) Patent No.: US 11,604,445 B2
(45) Date of Patent: Mar. 14, 2023

(54) CONTROL SYSTEM AND CONTROL METHOD

(71) Applicant: NIPPON TELEGRAPH AND TELEPHONE CORPORATION, Tokyo (JP)

(72) Inventors: Yushi Koyasako, Tokyo (JP); Takahiro Suzuki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 30 days.

(21) Appl. No.: 17/263,865

(22) PCT Filed: Jul. 30, 2019

(86) PCT No.: PCT/JP2019/029739
§ 371 (c)(1),
(2) Date: Jan. 27, 2021

(87) PCT Pub. No.: WO2020/027086
PCT Pub. Date: Feb. 6, 2020

(65) Prior Publication Data
US 2021/0312792 A1    Oct. 7, 2021

(30) Foreign Application Priority Data

Aug. 3, 2018 (JP) .............................. JP2018-146906

(51) Int. Cl.
*G05B 19/042* (2006.01)
*G08C 13/00* (2006.01)

(52) U.S. Cl.
CPC .................. *G05B 19/0421* (2013.01); *G05B 2219/25232* (2013.01); *G08C 13/00* (2013.01)

(58) Field of Classification Search
None
See application file for complete search history.

(56) References Cited

U.S. PATENT DOCUMENTS 10,187,279 B2 * 1/2019 Ishii ........................ H04L 43/10
2006/0091899 A1 * 5/2006 Akimichi ......... H03K 19/17764
326/10

(Continued)

FOREIGN PATENT DOCUMENTS

WO    WO-2019239697 A1    12/2019

OTHER PUBLICATIONS

Chien-Liang Lai et al., "Design the Remote Control System With the Time-Delay Estimator and the Adaptive Smith Predictor", IEEE Transactions on Industrial Informatics, vol. 6, No. 1, pp. 73-80, IEEE, Feb. 2010.

*Primary Examiner* — Philip Wang
(74) *Attorney, Agent, or Firm* — Harness, Dickey & Pierce, P.L.C.

(57) ABSTRACT

A control system includes a control unit configured to control a target controlled apparatus, and at least one communication processing unit configured to execute communication processing in communication between the target controlled apparatus and the control unit, and in the control system, the communication processing unit sequentially measures a processing time of the communication processing and sequentially outputs delay information indicating the measured processing time to the control unit, and the control unit sequentially acquires the delay information from all of a plurality of the communication processing units, and sequentially updates delay information incorporated in a control algorithm for controlling the target controlled apparatus based on the acquired delay information.

6 Claims, 9 Drawing Sheets

(56) References Cited

U.S. PATENT DOCUMENTS

2011/0292356 A1\* 12/2011 Tsukinoki ......... H01L 21/67276
                                                              355/27
2017/0289827 A1\* 10/2017 Harel .................... H04B 17/364
2019/0163534 A1\*  5/2019 Park .......................... G06F 9/50
2021/0258903 A1\*  8/2021 Suzuki ................ H04W 56/004
2022/0156124 A1\*  5/2022 Nandavanam ........ G06F 9/5077
2022/0335262 A1\* 10/2022 Chang ................ G06K 15/1822
2022/0342086 A1\* 10/2022 Yoshida .................. G01S 19/51

\* cited by examiner

CONTROL SYSTEM AND CONTROL METHOD

CROSS-REFERENCE TO RELATED APPLICATIONS

This application is a 371 U.S. National Phase of International Application No. PCT/JP2019/029739 filed on Jul. 30, 2019, which claims priority to Japanese Application No. 2018-146906 filed on Aug. 3, 2018. The entire disclosures of the above applications are incorporated herein by reference.

TECHNICAL FIELD

The present disclosure relates to a control system and a control method.

BACKGROUND ART

Communication delay occurring in the network (hereinafter referred to as "network delay") may have a negative impact on control performances in the real-time control of Internet of Things (IoT) terminals via a network. For example, a decrease in control performances may increase the time required for the control system to stabilize, and may render IoT terminals uncontrollable.

In general, as the distance between an IoT terminal to be controlled (hereinafter referred to as a "target controlled apparatus") and a control apparatus that controls the target controlled apparatus increases, and as the number of communication apparatuses passed in communication between the target controlled apparatus and the control apparatus increases, the network delay becomes larger.

In recent years, technologies have been proposed for edge computing that reduces the magnitude of the network delay by installing a server in the vicinity of the target controlled apparatus and executing edge processing. However, in the real-time control of an IoT terminal, not only the magnitude of the network delay, but also the fluctuation (jitter) of the network delay also adversely affects the control performances.

In accordance with a condition change within the network based on, for example, a change in the communication band, the number of nodes, the communication protocol and the like, a processing time of communication processing executed by a communication apparatus on the station side changes which causes jitter to occur. Especially in the real-time control, it is necessary to reduce the effect brought by jitter.

In contrast, techniques have been proposed in which the effect brought by jitter is reduced by sequentially measuring a delay time and controlling the target controlled apparatus in real time based on the measured delay time. In the art like this, it is common to calculate an amount of delay in communication between the control apparatus and the target controlled apparatus using a measurement value of a Round Trip Time (RTT) (see Non Patent Literature 1, for example).

Hereinafter, a known control system will be briefly described. FIG. 12 is a schematic diagram illustrating an example of a configuration of a known control system. As illustrated in FIG. 12, a target controlled apparatus includes a sensor node and an actuator node, and a control apparatus includes a controller. First, at the beginning of a control period, data is transmitted from the sensor node of the target controlled apparatus to the controller of the control apparatus. This allows the control apparatus to obtain a value for $t_1$, an amount of delay, indicating the magnitude of a network delay in communication in the direction from the target controlled apparatus to the control apparatus. Next, data is transmitted from the controller of the control apparatus to the actuator node of the target controlled apparatus. This way, the control apparatus can obtain a value for $t_2$, an amount of delay, indicating the magnitude of a network delay in communication in the direction from the control apparatus to the target controlled apparatus.

At this time, RTT is represented by $t_1+t_2$. The control apparatus incorporates delay information based on the value of this RTT into a control algorithm executed by the controller. This control algorithm is an algorithm for controlling the target controlled apparatus. The control apparatus sequentially updates the delay information incorporated in the control algorithm by measuring the RTT for each control period. This allows the control system to reduce the effect brought by jitter in the network.

CITATION LIST

Non Patent Literature

Non Patent Literature 1: Chien-Liang Lai et al., "Design the Remote Control System With the Time-Delay Estimator and the Adaptive Smith Predictor" IEEE TRANSACTIONS on INDUSTRIAL INFORMATICS, VOL. 6, NO. 1, pp. 73-80, IEEE, February 2010

SUMMARY OF THE INVENTION

Technical Problem

However, known control systems as described above do not consider the presence of a communication apparatus between a control apparatus and a target controlled apparatus. On the other hand, many network delays occur often in a communication apparatus. Depending on the network situation, as the processing time in the communication apparatus increases, the magnitude of the network delay becomes larger. When the RTT cannot be measured within the control period due to an increase in the network delay, the control apparatus, for example, needs to incorporate delay information which is estimated based on a previously measured RTT measurement value into the control algorithm. In this case, there is a problem in that a deviation tends to occur between the estimated delay information and the delay information based on the magnitude of the actual network delay, which makes it difficult to reduce the effect brought by jitter in controlling the target controlled apparatus.

In view of the above circumstances, an advantage of some aspects of the disclosure is to provide a technology capable of reducing the effect brought by jitter in controlling the target controlled apparatus.

Means for Solving the Problem

An aspect of the present disclosure is a control system including a control unit configured to control a target controlled apparatus, and at least one communication processing unit configured to execute communication processing in communication between the target controlled apparatus and the control unit, wherein the communication processing unit sequentially measures a processing time of the communication processing and sequentially outputs delay information indicating the measured processing time to the control unit, and the control unit sequentially acquires the delay information from all of a plurality of the communication processing units, and based on the acquired delay information, sequentially updates delay information incorporated in a control algorithm for controlling the target controlled apparatus.

An aspect of the present disclosure is the above-mentioned control system, wherein the communication processing unit measures the processing time based on a start time of the communication processing and an end time of the communication processing.

In addition, an aspect of the present disclosure is the above-mentioned control system, wherein when a time obtained by subtracting the processing time measured last time from the processing time measured this time is longer than a predetermined length, the control unit updates the delay information incorporated in the control algorithm.

An aspect of the present disclosure is a control system including a control unit configured to control a target controlled apparatus; and at least one communication processing unit configured to execute communication processing in communication between the target controlled apparatus and the control unit, wherein the control unit sequentially estimates a processing time of the communication processing of the communication processing unit by analyzing and learning a received communication packet, and based on delay information indicating the estimated processing time, sequentially updates delay information incorporated in a control algorithm for controlling the target controlled apparatus.

An aspect of the present disclosure is a control method performed by a control system including a control unit configured to control a target controlled apparatus, and at least one communication processing unit configured to execute communication processing in communication between the target controlled apparatus and the control unit, the method including: sequentially measuring a processing time of the communication processing and sequentially outputting delay information indicating the measured processing time to the control unit, and sequentially acquiring the delay information from all of a plurality of the communication processing units, and based on the acquired delay information, sequentially updating delay information incorporated in a control algorithm for controlling the target controlled apparatus.

An aspect of the present disclosure is a control method performed by a control system including a control unit configured to control a target controlled apparatus, and at least one communication processing unit configured to execute communication processing in communication between the target controlled apparatus and the control unit, the method including sequentially estimating a processing time of the communication processing of the communication processing unit by analyzing and learning a received communication packet, and based on delay information indicating the estimated processing time, sequentially updating delay information incorporated in a control algorithm for controlling the target controlled apparatus.

Effects of the Invention

According to the present disclosure, the effect brought by jitter in controlling the target controlled apparatus can be reduced.

DESCRIPTION OF EMBODIMENTS

First Embodiment

Hereinafter, a first embodiment of the present disclosure will be described with reference to the drawings.

Figure 1:
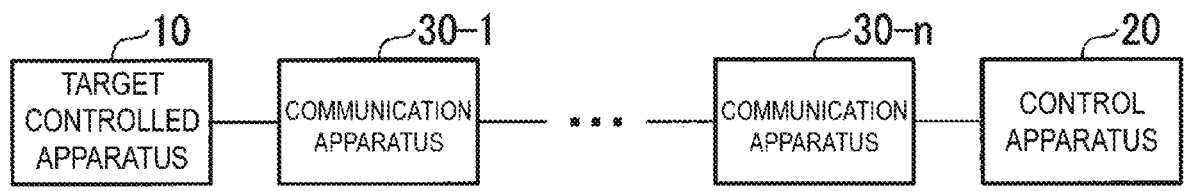
FIG. 1 is a schematic diagram illustrating the basic configuration of a control system according to a first embodiment of the present disclosure.

FIG. 1 is a schematic diagram illustrating the basic configuration of a control system according to a first embodiment of the present disclosure. As illustrated in FIG. 1, the control system includes a target controlled apparatus 10, a control apparatus 20 (control unit), and a plurality of communication apparatuses 30 (30-1 to 30-$n$) (communication processing units).

The target controlled apparatus 10 is, for example, an IoT terminal such as a sensor or an actuator. The control apparatus 20 is a server apparatus that controls the target controlled apparatus 10 in real time. Note that, for simplification of description, only a single control apparatus 20 and a single target controlled apparatus 10 are illustrated in FIG. 1. However, the control system is not limited to such a configuration, and a single control apparatus 20 may be configured to control a plurality of target controlled apparatuses 10 in real time.

As illustrated in FIG. 1, the target controlled apparatus 10, the control apparatus 20, and the plurality of communication apparatuses 30 (30-1 to 30-$n$) are connected in series. The target controlled apparatus 10 communicates with the control apparatus 20 via the plurality of communication apparatuses 30 (30-1 to 30-$n$). Note that the target controlled apparatus 10 may communicate with the control apparatus 20 via only one communication apparatus 30.

Each of the plurality of communication apparatuses 30 (30-1 to 30-*n*) sequentially measures the processing time of the communication processing executed by the communication apparatuses 30 (30-1 to 30-*n*). Then, the plurality of communication apparatuses 30 (30-1 to 30-*n*) each transmit information indicating the measured processing time to the control apparatus 20. In this way, the control apparatus 20 can sequentially acquire information indicating the processing time of the communication processing executed by the communication apparatuses 30 (30-1 to 30-*n*) from all of the communication apparatuses 30 (30-1 to 30-*n*).

Note that a change in the processing time of the communication processing executed by the communication apparatuses 30 (30-1 to 30-*n*) causes to generate jitter in the network, as described above.

Note that a type of the network delay occurring in the communication between the target controlled apparatus 10 and the control apparatus 20 is not limited to the delay occurring only due to communication processing executed by the communication apparatuses 30 (30-1 to 30-*n*). However, for simplification of description, the delay time of the network delay occurring in the communication between the target controlled apparatus 10 and the control apparatus 20 is an integrated value of the processing time of the communication processing executed by all of the communication apparatuses 30 (30-1 to 30-*n*).

Each time the control apparatus 20 acquires the information indicating the processing time (hereinafter referred to as "delay information") from all of the communication apparatuses 30 (30-1 to 30-*n*), the control apparatus 20 sets a control algorithm executed by the control apparatus 20. That is, the control apparatus 20 updates the delay information incorporated in the control algorithm based on the sequentially acquired delay information each time. Note that the control algorithm described herein is an algorithm executed by the control apparatus 20 for controlling the target controlled apparatus 10 in real time.

With the configuration described above, the control apparatus 20 can reduce the effect brought by jitter in the network by controlling the target controlled apparatus 10 based on the sequentially updated delay information.

Configuration of Control System

First, the configuration of the control system according to the first embodiment will be described in more detail.

Figure 2:
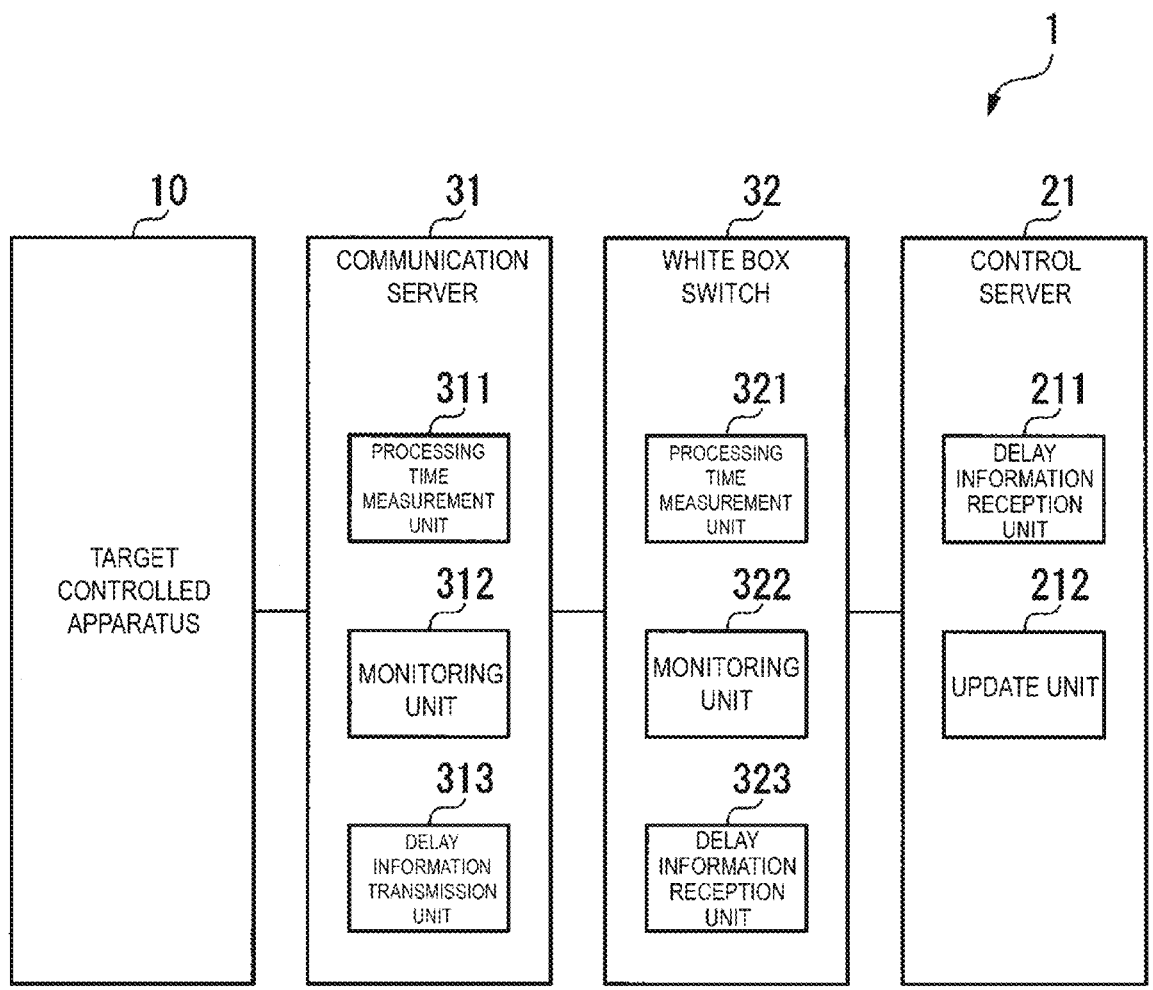
FIG. 2 is a block diagram illustrating the configuration of a control system 1 according to the first embodiment of the present disclosure.

FIG. 2 is a block diagram illustrating the configuration of the control system 1 according to the first embodiment of the present disclosure.

As illustrated in FIG. 2, the control system 1 includes the target controlled apparatus 10, the control server 21, a communication server 31, and a white box switch 32.

The target controlled apparatus 10 is an IoT terminal and is an apparatus managed on the user side. The control server 21, the communication server 31, and the white box switch 32 are apparatuses managed on the station side.

The control system 1 is a system for controlling the target controlled apparatus 10 by edge computing on the station side in real time.

As illustrated in FIG. 2, the control server 21 includes a delay information reception unit 211 and an update unit 212. The communication server 31 includes a processing time measurement unit 311, a monitoring unit 312, and a delay information transmission unit 313. The white box switch 32 includes a processing time measurement unit 321, a monitoring unit 322, and a delay information transmission unit 323.

Note that the control server 21 is an apparatus corresponding to the control apparatus 20 of the control system illustrated in FIG. 1. The communication server 31 and the white box switch 32 are apparatuses corresponding to the communication apparatus 30 of the control system illustrated in FIG. 1.

The control server 21 is a server apparatus that controls the target controlled apparatus 10 in real time. Note that, in FIG. 1, for simplification of description, a configuration where only a single control server 21 and a single target controlled apparatus 10 are controlled is illustrated. However, the control system 1 is not limited to this configuration, and a single control server 21 may be configured to control a plurality of target controlled apparatuses 10 in real time.

As illustrated in FIG. 2, the target controlled apparatus 10, the communication server 31, the white box switch 32, and the control server 21 are connected in series. The target controlled apparatus 10 communicates with the control server 21 via the communication server 31 and the white box switch 32.

The processing time measurement unit 311 of the communication server 31 sequentially measures the processing time of the communication processing executed by the communication server 31.

The monitoring unit 312 of the communication server 31 determines whether to transmit delay information indicating the processing time to the control server 21 based on the processing time measured by the processing time measurement unit 311 and the period of the measurement by the processing time measurement unit 311. Details of this determination processing will be described below.

When the monitoring unit 312 determines to transmit the delay information, the delay information transmission unit 313 of the communication server 31 transmits the delay information to the control server 21.

The configurations of the processing time measurement unit 321, the monitoring unit 322, and the delay information transmission unit 323 of the white box switch 32 are the same as the configurations of the processing time measurement unit 311, the monitoring unit 312, and the delay information transmission unit 313 of the communication server 31, respectively. The processing time measurement unit 321 of the white box switch 32 sequentially measures the processing time of the communication processing executed by the white box switch 32. The monitoring unit 322 of the white box switch 32 determines whether to transmit delay information indicating the processing time to the control server 21 based on the processing time measured by the processing time measurement unit 321 and the period of the measurement by the processing time measurement unit 321.

When the monitoring unit 322 determines to transmit the delay information, the delay information transmission unit 323 of the white box switch 32 transmits the delay information to the control server 21.

The delay information reception unit 211 of the control server 21 receives the delay information transmitted from each of the communication server 31 and the white box switch 32. The update unit 212 of the control server 21 sequentially updates the delay information incorporated in the control algorithm executed by the control server 21 based on the delay information sequentially acquired by the delay information reception unit 211.

The controller (not illustrated) of the control server 21 controls the target controlled apparatus 10 in real time by the control algorithm with updated delay information.

Operation of Control System Hereinafter, an example of the operation of the control system 1 is described.

Figure 3:
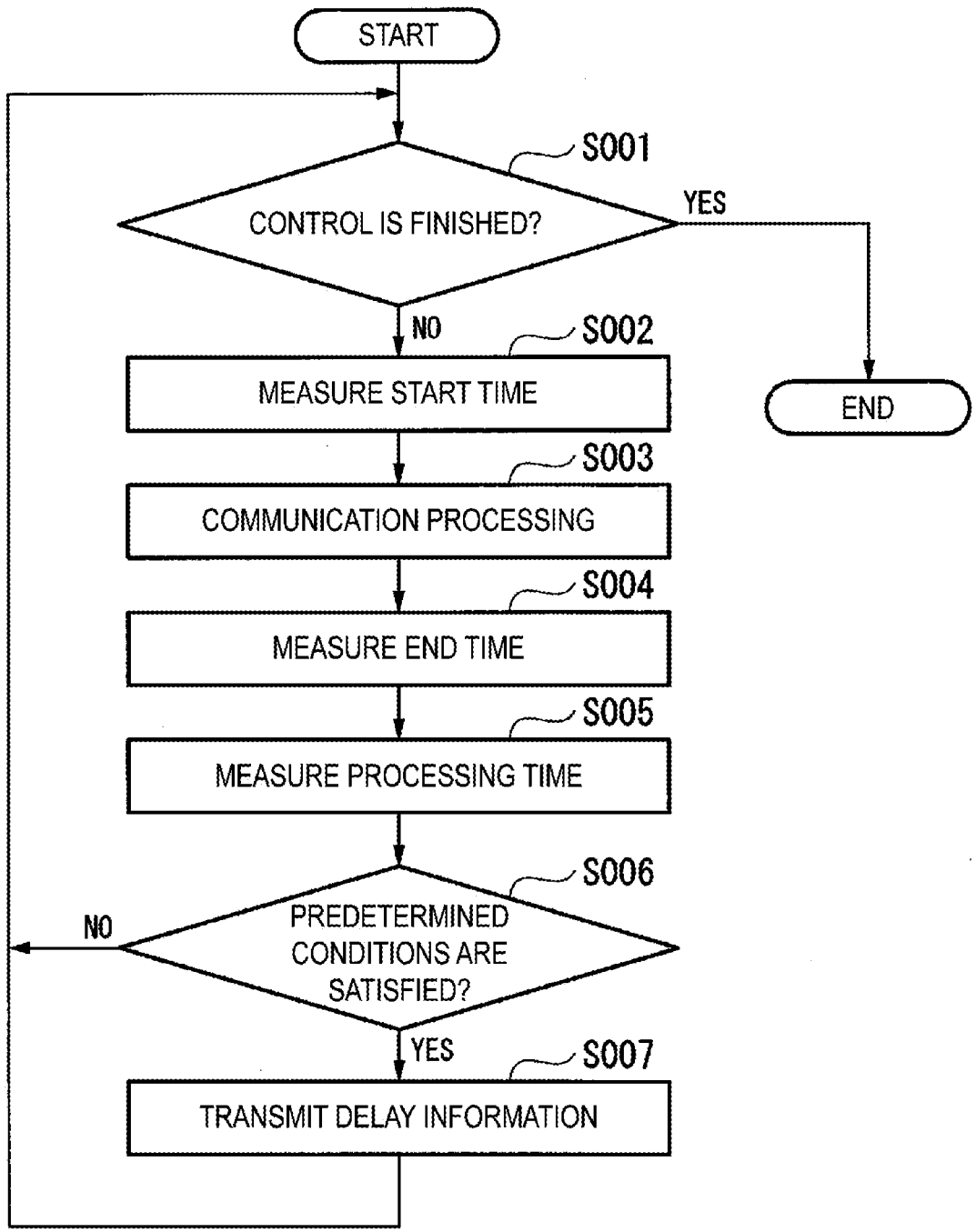
FIG. 3 is a flowchart illustrating an operation of transmitting delay information by a communication server 31 of the control system 1 according to the first embodiment of the present disclosure.

FIG. 3 is a flowchart illustrating an operation of transmitting delay information by the communication server 31 of the control system 1 according to the first embodiment of the present disclosure.

When the real-time control for the target controlled apparatus 10 by the control server 21 is finished (Yes in step S001), the communication server 31 terminates the operation of transmitting the delay information in the flowchart of FIG. 3.

When the real-time control for the target controlled apparatus 10 by the control server 21 continues (No in step S001), the processing time measurement unit 311 measures a start time of the communication processing (step S002).

The communication server 31 executes communication processing (step S003). When the communication processing is finished, the processing time measurement unit 311 measures an end time of the communication processing (step S004).

The processing time measurement unit 311 measures the processing time based on the measured start time and end time (step S005).

The monitoring unit 312 determines whether a predetermined transmission condition is satisfied based on the processing time measured by the processing time measurement unit 311 and the period of the measurement by the processing time measurement unit 311.

The predetermined transmission condition will be described later.

When the monitoring unit 312 that determines that the predetermined transmission condition is satisfied (Yes in step S006), the delay information transmission unit 313 transmits delay information indicating the processing time measured by the processing time measurement unit 311 to the control server 21 (step S007). When the monitoring unit 312 determines that the predetermined transmission condition is not satisfied (No in step S006), the delay information transmission unit 313 does not transmit the delay information indicating the processing time measured by the processing time measurement unit 311.

The processing in step S002 and subsequent steps is repeated until the real-time control for the target controlled apparatus 10 by the control server 21 is finished.

Note that the operation of transmitting the delay information by the white box switch 32 is the same as the above-mentioned operation of transmitting the delay information by the communication server 31, the description thereof is omitted.

Figure 4:
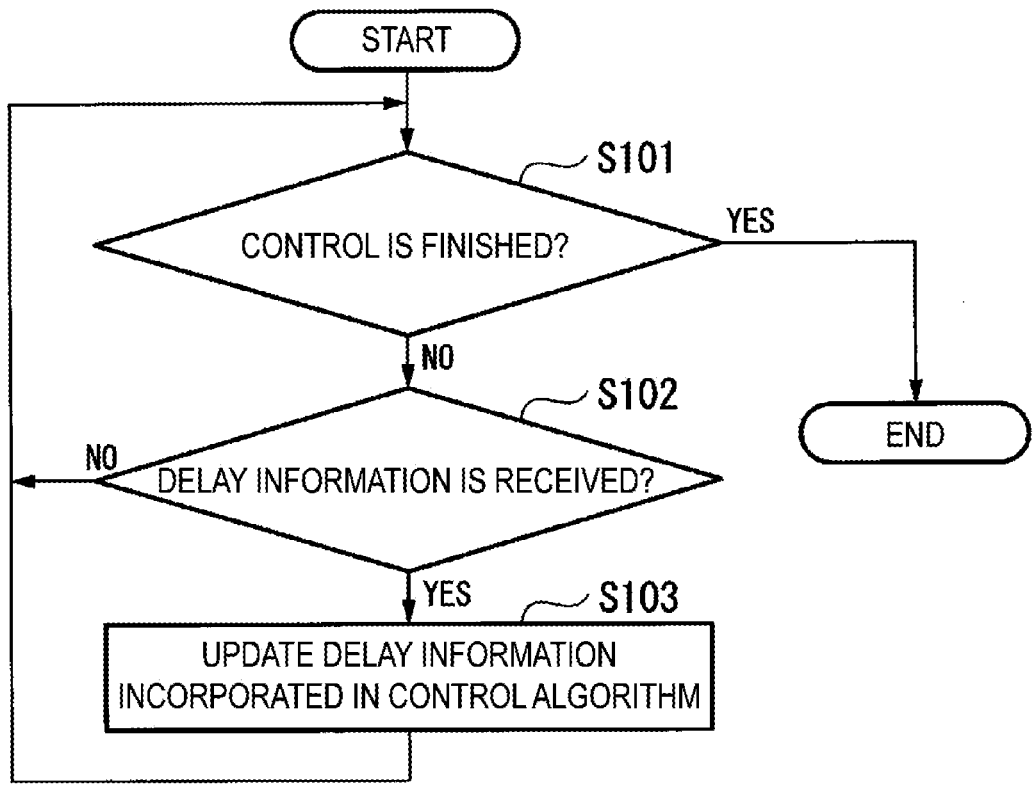
FIG. 4 is a flowchart illustrating an operation of updating delay information by a control server 21 of the control system 1 according to the first embodiment of the present disclosure.

FIG. 4 is a flowchart illustrating the operation of updating delay information by the control server 21 of the control system 1 according to the first embodiment of the present disclosure.

When the real-time control for the target controlled apparatus 10 by the control server 21 is finished (Yes in step S101), the control server 21 terminates the operation of updating the delay information in the flowchart of FIG. 4.

When the real-time control for the target controlled apparatus 10 by the control server 21 continues (No in step S101), the delay information reception unit 211 waits for the delay information transmitted from the communication server 31 and the white box switch 32.

When the delay information reception unit 211 receives the delay information (Yes in step S102), the update unit 212 updates the delay information incorporated in the control algorithm based on the received delay information (step S103). When the delay information reception unit 211 does not receive the delay information (No in step S102), the update unit 212 does not update the delay information incorporated in the control algorithm.

The processing in step S102 and subsequent steps is repeated until the real-time control for the target controlled apparatus 10 by the control server 21 is finished.

Transmission Determination Processing

An example of delay information transmission determination processing executed by the communication server 31 will be described below. Note that the delay information transmission determination processing executed by the white box switch 32 is the same as the processing described below and thus, the description thereof is omitted.

The processing time measurement unit 311 of the communication server 31 measures the processing time of the communication processing executed by the communication server 31 for each control period or for each period less than the control period. The monitoring unit 312 of the communication server 31 uses the processing time measured by the processing time measurement unit 311 to determine whether the predetermined condition indicated by the following equation (1) is satisfied.

$$D(t)-D(t-1)>dt \quad (1)$$

Here, D(t) indicates the processing time measured in the current measurement. Additionally, D(t−1) indicates the processing time measured last time. dt indicates the control period of the control server 21.

When the monitoring unit 312 determines that the predetermined condition indicated by the above equation (1) is satisfied, the delay information transmission unit 313 transmits delay information indicating the processing time measured in the current measurement to the control server 21. Note that in a case that the monitoring unit 312 determines that the predetermined condition indicated by the above equation (1) is not satisfied, the delay information transmission unit 313 does not transmit the delay information.

In other words, when time acquired by subtracting the processing time measured last time from the processing time measured this time is longer than a predetermined length (control period), the delay information is transmitted to the control server 21, and the control algorithm (updating of the delay information) is carried out in the control server 21.

An example of the case using an adaptive Smith estimator (see Non Patent Literature 1) will be described below.

Figure 5:
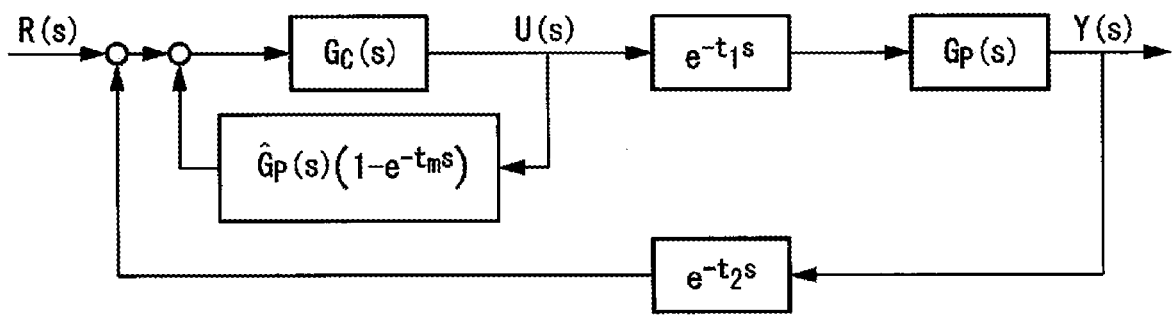
FIG. 5 is a block diagram illustrating the configuration using an adaptive Smith estimator.

FIG. 5 is a block diagram illustrating the configuration using an adaptive Smith estimator. In FIG. 5, $G_C(s)$ indicates a control apparatus. In addition, $G_P(s)$ indicates a target controlled apparatus. $t_1$ and $t_2$ indicate a delay in the downlink communication and a delay in the uplink communication between the control apparatus and the target controlled apparatus, respectively. R(s) indicates a target value. U(s) indicates a control input value. Y(s) indicates a control amount. $G_P(s)$ block with circumflex indicates an adaptive Smith estimator.

By causing the adaptive Smith estimator to sequentially reflect the delay value generated in the network as $t_m$ in the passing control system, the delay effect can be reduced.

Second Embodiment

Hereinafter, the second embodiment of the present disclosure is described with reference to drawings.

Configuration of Control System

Figure 6:
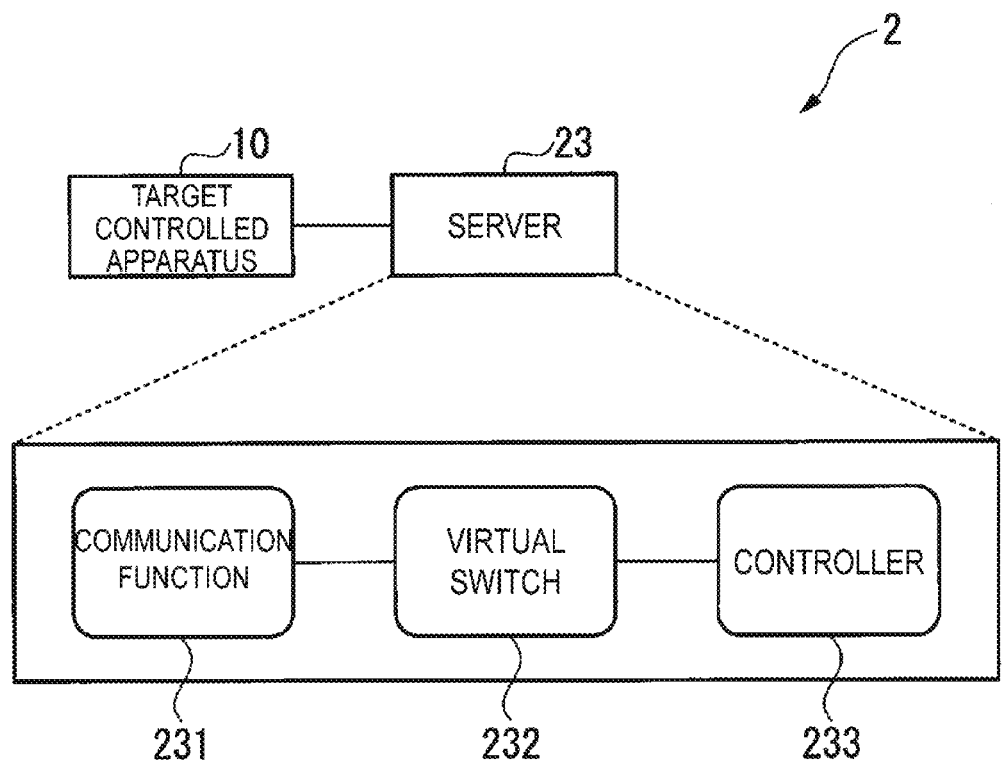
FIG. 6 is a block diagram illustrating the configuration of a control system 2 according to a second embodiment of the present disclosure.

FIG. 6 is a block diagram illustrating the configuration of a control system 2 according to the second embodiment of the present disclosure. As illustrated in FIG. 6, the control system 2 includes a target controlled apparatus 10 and a server 23. The server 23 includes a communication function 231 (communication processing unit), a virtual switch 232, and a controller 233 (control unit).

The control system 2 according to the second embodiment is a software version of the communication apparatus in the control system 1 according to the first embodiment. In other words, the communication function 231 is a software version of the function of the communication server 31 of the control system 1 according to the first embodiment, and the virtual switch 232 is a software version of the function of the white box switch 32 of the control system 1.

The target controlled apparatus 10 communicates with the server 23 having the communication function 231, the virtual switch 232, and the controller 233. Assuming the edge computing, the target controlled apparatus 10 is an apparatus on the user side, and the server 23 is an apparatus on the station side.

Similar to the communication server 31 of the control system 1, the communication function 231 has the function of measuring the processing time of the communication processing, the function of determining whether or not delay information is output to the controller 233 based on the measured processing time, and the function of outputting the delay information to the controller 233. Similar to the white box switch 32 of the control system 1, the virtual switch 232 has the function of measuring the processing time of the communication processing, the function of determining whether or not the delay information is output to the controller 233 based on the measured processing time, and the function of outputting the delay information to the controller 233. In addition, similar to the control server 21 of the control system 1, the controller 233 has the function of accepting the input of the delay information, and the function of updating the delay information incorporated in the control algorithm based on the input delay information.

Third Embodiment

Hereinafter, the third embodiment of the present disclosure is described with reference to the drawings.

Configuration of Control System

Figure 7:
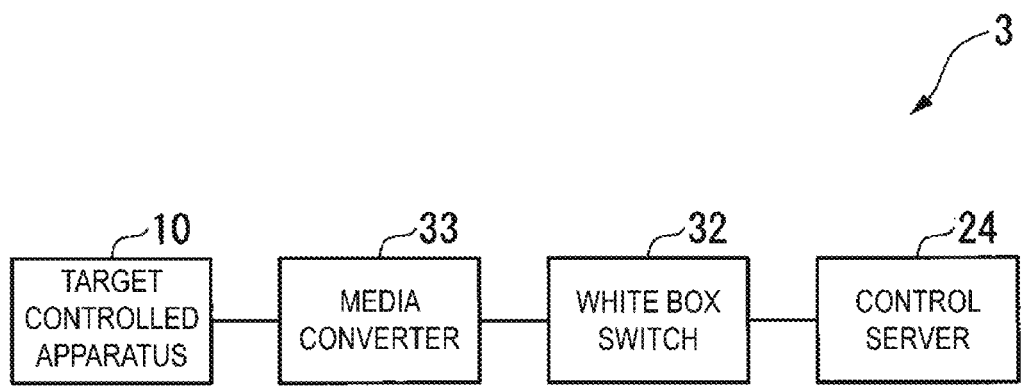
FIG. 7 is a block diagram illustrating the configuration of a control system 3 according to a third embodiment of the present disclosure.

FIG. 7 is a block diagram illustrating the configuration of a control system 3 according to the third embodiment of the present disclosure. As illustrated in FIG. 7, the control system 3 includes a target controlled apparatus 10, a control server 24, a white box switch 32, and a media converter 33.

The control system 3 according to the third embodiment is obtained by replacing the communication server 31 of the control system 1 according to the first embodiment with a dedicated apparatus (media converter 33).

The target controlled apparatus 10 communicates with the control server 24 via the media converter 33 and the white box switch 32.

Similar to the communication server 31 of the control system 1 according to the first embodiment, the media converter 33 has a function unit that measures the processing time of the communication processing, a function unit that determines whether delay information is output to the controller 233 based on the measured processing time, and a function unit that outputs the delay information to the controller 233. In other words, the media converter 33 includes the function units (not illustrated), which correspond to the processing time measurement unit 311, the monitoring unit 312, and the delay information transmission unit 313 of the communication server 31 in the control system 1 of the first embodiment.

Fourth Embodiment

Hereinafter, the fourth embodiment of the present disclosure will be described with reference to the drawings.

Configuration of Control System

Figure 8:
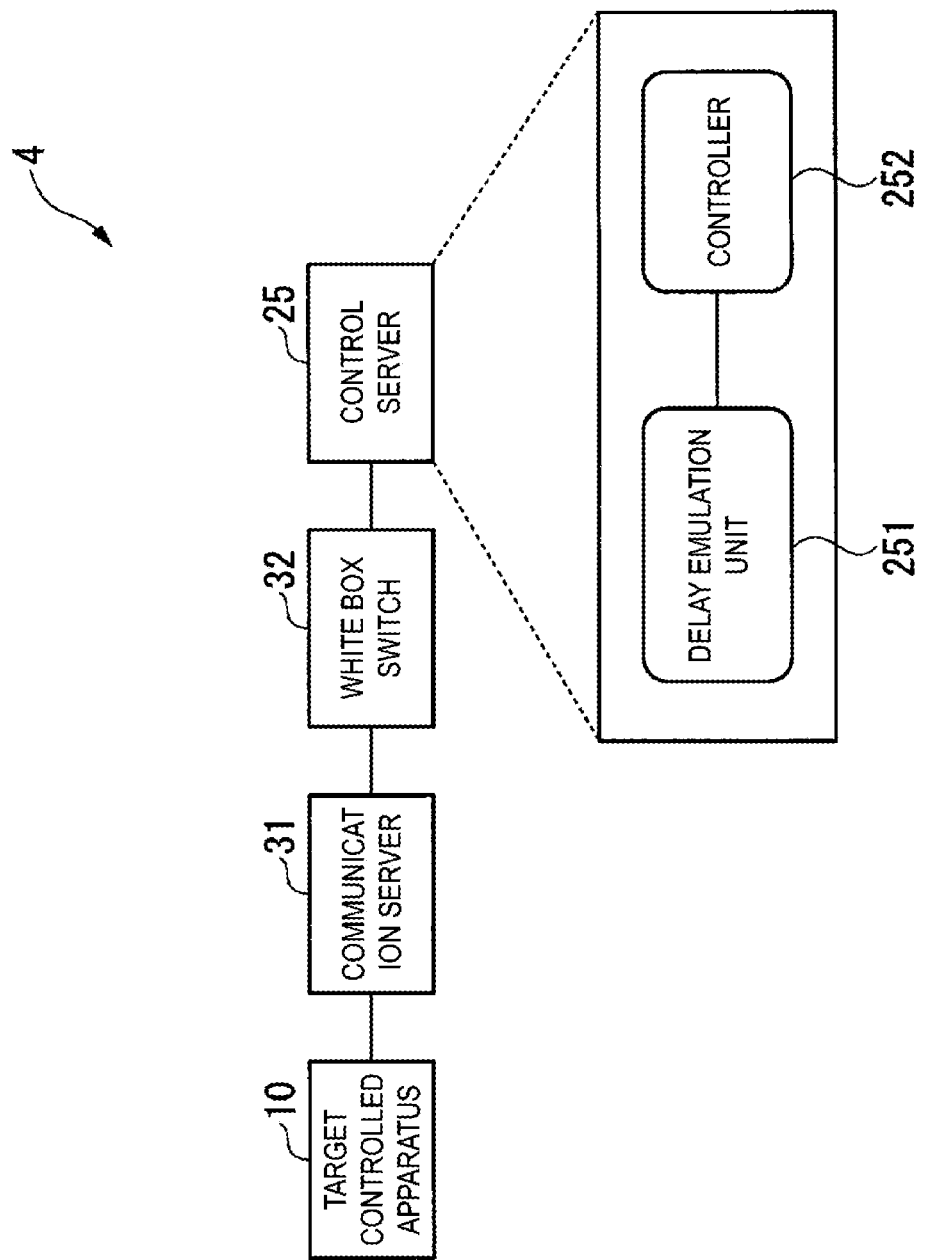
FIG. 8 is a block diagram illustrating the configuration of a control system 4 according to a fourth embodiment of the present disclosure.

FIG. 8 is a block diagram illustrating the configuration of a control system 4 according to the fourth embodiment of the present disclosure. As illustrated in FIG. 8, the control system 4 includes a target controlled apparatus 10, a control server 25, a communication server 31, and a white box switch 32. The control server 25 also includes a delay emulation unit 251 and a controller 252.

The control system 3 according to the third embodiment differs from the control system 1 according to the first embodiment in that the control server 25 is provided instead of the control server 21 of the control system 1 according to the first embodiment. The control server 25 includes, in addition to the function units included in the control server 21, a delay emulation unit 251, which is a function unit that emulates a network condition.

The delay emulation unit 251 creates and updates a network delay model by analyzing and learning communication packets transmitted to the control server 25.

For example, when a Deep Neural Network (DNN) is used, the delay emulation unit 251 inputs data size, reception frequency, reception interval, etc. to extract a feature. In learning, the delay emulation unit 251 measures the RTT and the processing time in advance and determines parameters across an input layer and an output layer of the DNN by back propagation using the acquired delay information as training data.

The delay emulation unit 251 estimates delay information for each control period using the network delay model obtained by the learning described above, and outputs the estimated delay information to the controller 252.

In addition, similar to the control server 21 of the control system 1 according to the first embodiment, the controller 252 has the function of accepting the input of the delay information, and the function of updating the delay information incorporated in the control algorithm based on the input delay information. In other words, the controller 252 includes a function unit (not illustrated), which correspond to the delay information reception unit 211 and the update unit 212 of the control server 21 in the control system 1 of the first embodiment.

Thus, the controller 252 can recognize the network condition from the acquired delay information and calculate a control input in consideration of the recognized network condition.

Operation of Control System

Figure 9:
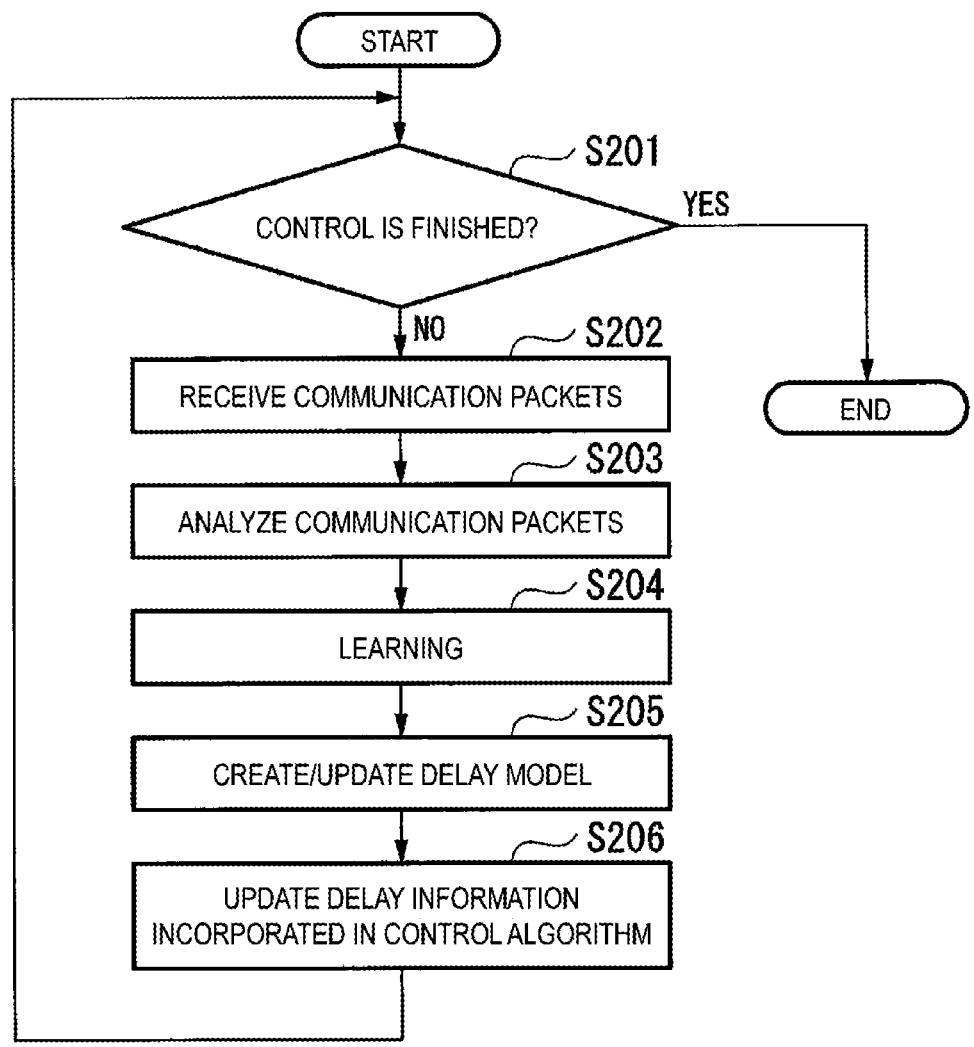
FIG. 9 is a flowchart illustrating an operation of updating delay information by a control server 25 of the control system 4 according to the fourth embodiment of the present disclosure.

Hereinafter, an example of the operation of the control system 4 will be described. FIG. 9 is a flowchart illustrating the operation of updating delay information by the control server 25 of the control system 4 according to the fourth embodiment of the present disclosure. When the real-time control for the target controlled apparatus 10 by the control server 25 is finished (Yes in step S201), the control server 25 terminates the operation of updating the delay information in the flowchart of FIG. 9.

When the real-time control for the target controlled apparatus 10 by the control server 25 continues (No in step S201), the control server 25 waits for communication packets and receives the communication packets (step S202).

The delay emulation unit 251 creates and updates a network delay model (step S205) by analyzing (step S203) and learning (step S204) the received communication packets.

The controller 252 estimates the delay information using the network delay model acquired by the delay emulation unit 251, and updates the delay information incorporated in the control algorithm based on the estimated delay information (step S206).

Fifth Embodiment

Hereinafter, a fifth embodiment of the present disclosure is described with reference to the drawing.

Configuration of Control System

Figure 10:
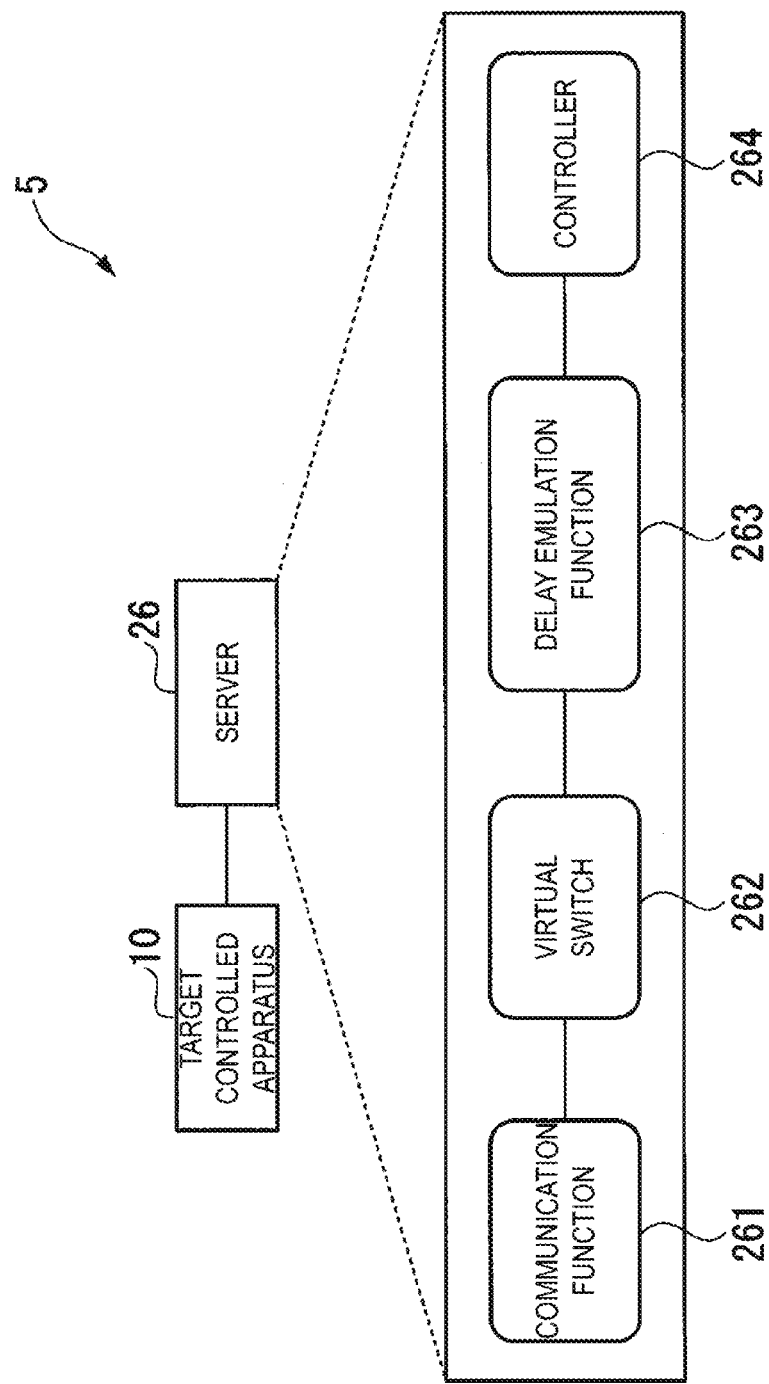
FIG. 10 is a block diagram illustrating the configuration of a control system 5 according to a fifth embodiment of the present disclosure.

FIG. 10 is a block diagram illustrating the configuration of a control system 5 according to the fifth embodiment of the present disclosure. As illustrated in FIG. 10, the control system 5 includes a target controlled apparatus 10 and a server 26. The server 26 has a communication function 261, a virtual switch 262, a delay emulation function 263, and a controller 264.

The control system 5 according to the fifth embodiment is a software version of the communication apparatus in the control system 4 according to the fourth embodiment. In other words, the communication function 261 is a software version of the function of the communication server 31 of the control system 4, and the virtual switch 262 is a software version of the function of the white box switch 32 of the control system 4.

The target controlled apparatus 10 communicates with the server 26 having the communication function 261, the virtual switch 262, the delay emulation function 263, and the controller 264.

The control system 5 according to the fifth embodiment differs from the control system 4 according to the fourth embodiment in that the server 26 is provided instead of the control server 25 of the control system 4 of the fourth embodiment. The server 26 includes, in addition to the function units of the control server 25 of the control system 4 according to the fourth embodiment, a delay emulation function 263, which is a function unit that emulates the network condition.

Sixth Embodiment

Hereinafter, a sixth embodiment of the present disclosure is described with reference to the drawing.

Configuration of Control System

Figure 11:
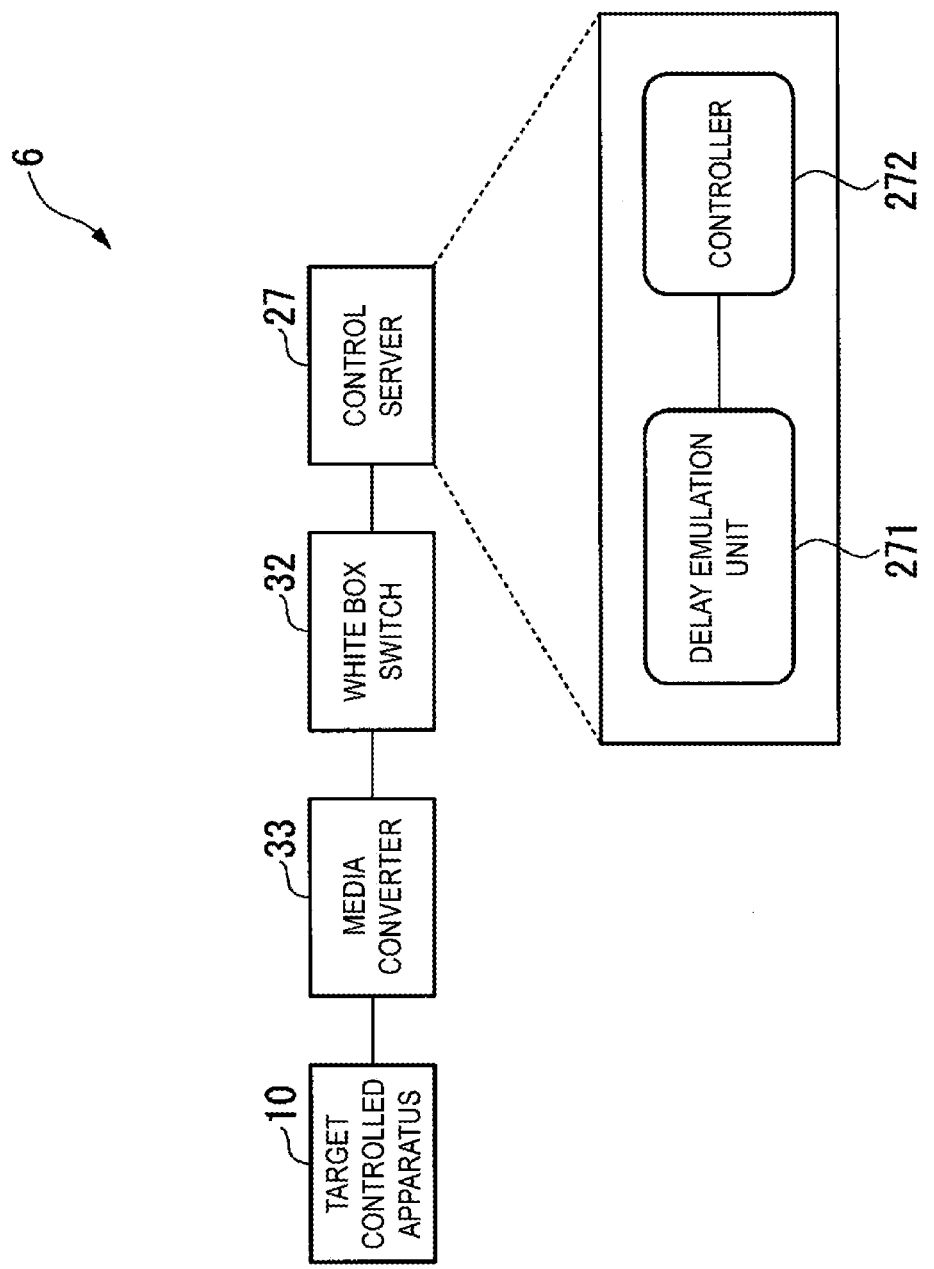
FIG. 11 is a block diagram illustrating the configuration of a control system 6 according to a sixth embodiment of the present disclosure.
Figure 12:
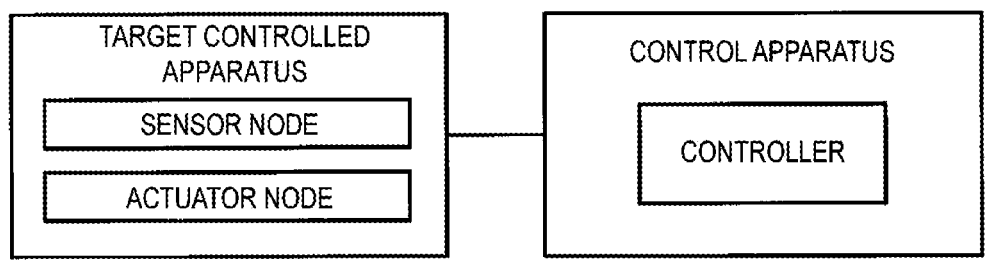
FIG. 12 is a schematic diagram illustrating an example of the configuration of a known control system.

FIG. 11 is a block diagram illustrating the configuration of a control system 6 according to the sixth embodiment of the present disclosure. As illustrated in FIG. 11, the control system 6 includes a target controlled apparatus 10, a control server 27, a white box switch 32, and a media converter 33. The control server 27 further includes a delay emulation unit 271 and a controller 272.

The control system 6 according to the sixth embodiment is obtained by replacing the communication server 31 of the control system 4 according to the fourth embodiment with a dedicated apparatus (media converter 33).

The target controlled apparatus 10 communicates with the control server 27 via the media converter 33 and the white box switch 32.

Similar to the communication server 31 of the control system 4 according to the fourth embodiment, the media converter 33 has a function unit that measures the processing time of the communication processing, a function unit that determines whether to output delay information to the controller 272 based on the measured processing time, and a function unit that outputs the delay information to the controller 272. In other words, the media converter 33 includes the function units (not illustrated) of the communication server 31 in the control system 4 of the fourth embodiment. That is, those function units correspond to the processing time measurement unit 311, the monitoring unit 312, and the delay information transmission unit 313 of the communication server 31 in the control system 1 of the first embodiment.

As described above, in the control system according to each of the embodiments described above, in the real-time control of the IoT terminal (the target controlled apparatus) via the network, each of the at least one communication apparatuses sequentially measures the processing time generated by the communication processing of the communication apparatus, and transmits delay information based on the processing time to the control apparatus. The control apparatus controls the target controlled apparatus in real time by incorporating delay information sequentially acquired from the respective communication apparatus in the control algorithm executed by the controller.

With the above-described configuration, the control system according to each of the above embodiments can sequentially consider effects of network delay and jitter to control the target controlled apparatus. This allows the control system according to each of the embodiments to reduce the time required for the control system to stabilize and reduce the effects of the network delay and jitter.

In addition, as described above, according to the known techniques, network delay is evaluated by measuring the RTT. To that end, the network delay is processed as a noninterventional value. The RTT measurement may also take time. Accordingly, the response to network delay based on the measurement result of the RTT is a passive response to a change in the network condition.

On the contrary, in the control system according to each of the above embodiments, the network delay is evaluated based on the integrated value of the processing time occurring in the communication apparatus. In other words, the control system according to each of the above embodiments can determine the value of the network delay by individually acquiring the processing time occurring in each communication apparatus. This allows the control system according to each of the above embodiments to actively respond in an event-driven manner, for example, to network delay variations based on a change in the network condition (e.g., an abrupt increase in processing instructions to the communication apparatus).

Although the embodiments of the present disclosure have been described above with reference to the drawings, it is clear that the above embodiments are merely examples of the present disclosure, and the present disclosure is not limited to the embodiments described above. Thus, addition, omission, substitution, and other modifications of the constituent components may be made without departing from the spirit and scope of the present disclosure.

Note that, each apparatus in the above-described embodiments can be realized by a computer and a program. The program can be recorded on a recording medium or provided via a network.

Part or all of the communication apparatus and the control apparatus in the above-described embodiments may be embodied as a computer. In such a case, the apparatuses may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

REFERENCE SIGNS LIST 1 to 6 Control system
10 Target controlled apparatus
20 Control apparatus
21, 24, 25, 27 Control server
23, 26 Server
30 (30-1 to 30-N) Communication apparatus
31 Communication server
32 White box switch
33 Media converter
211 Delay information reception unit
212 Update unit
231, 261 Communication function
232, 262 Virtual switch
233, 252, 264, 272 Controller
251, 271 Delay emulation unit
253, 263 Delay emulation function
311, 321 Processing time measurement unit
312, 322 Monitoring unit
313, 323 Delay information transmission unit

The invention claimed is:

1. A control system comprising:
a control unit configured to control a target controlled apparatus; and
a communication processing unit disposed on a communication path between the target controlled apparatus and the control unit and configured to execute communication processing in communication between the target controlled apparatus and the control unit,
wherein the target controlled apparatus and the control unit are configured to communicate with each other via the communication processing unit,
wherein the communication processing unit sequentially measures a processing time of the communication processing and sequentially outputs delay information indicating the measured processing time to the control unit, and
the control unit sequentially acquires the delay information from the communication processing unit, and based on the acquired delay information, sequentially updates delay information incorporated in a control algorithm for controlling the target controlled apparatus,
wherein each of the control unit and the communication processing unit is implemented by:
i) computer executable instructions executed by at least one processor,
ii) at least one circuitry or
iii) a combination of computer executable instructions executed by at least one processor and at least one circuitry.

2. The control system according to claim 1, wherein the communication processing unit measures the processing time based on a start time of the communication processing and an end time of the communication processing.

3. The control system according to claim 1, wherein, when a time obtained by subtracting the processing time measured last time from the processing time measured this time is longer than a predetermined length, the control unit updates the delay information incorporated in the control algorithm.

4. A control method performed by a control system including a control unit configured to control a target controlled apparatus, and a communication processing unit disposed on a communication path between the target controlled apparatus and the control unit and configured to execute communication processing in communication between the target controlled apparatus and the control unit,
wherein the target controlled apparatus and the control unit are configured to communicate with each other via the communication processing unit,
wherein each of the control unit and the communication processing unit is implemented by:
i) computer executable instructions executed by at least one processor,
ii) at least one circuitry or iii) a combination of computer executable instructions executed by at least one processor and at least one circuitry, the control method comprising:
sequentially measuring, by the communication processing unit, a processing time of the communication processing and sequentially outputting delay information indicating the measured processing time to the control unit, and
sequentially acquiring the delay information from the communication processing unit, and based on the acquired delay information, sequentially updating delay information incorporated in a control algorithm for controlling the target controlled apparatus.

5. A control system comprising:
a control unit configured to control a target controlled apparatus; and
a communication processing unit disposed on a communication path between the target controlled apparatus and the control unit and configured to execute communication processing in communication between the target controlled apparatus and the control unit,
wherein the communication processing unit sequentially measures a processing time of the communication processing and sequentially outputs delay information indicating the measured processing time to the control unit, and
the control unit sequentially acquires the delay information from the communication processing unit, and based on the acquired delay information, sequentially updates delay information incorporated in a control algorithm for controlling the target controlled apparatus, wherein, when a time obtained by subtracting the processing time measured last time from the processing time measured this time is longer than a predetermined length, the control unit updates the delay information incorporated in the control algorithm, wherein each of the control unit and the communication processing unit is implemented by:
i) computer executable instructions executed by at least one processor,
ii) at least one circuitry or
iii) a combination of computer executable instructions executed by at least one processor and at least one circuitry.

6. A control method performed by a control system including a control unit configured to control a target controlled apparatus, and a communication processing unit disposed on a communication path between the target controlled apparatus and the control unit and configured to execute communication processing in communication between the target controlled apparatus and the control unit, wherein each of the control unit and the communication processing unit is implemented by:
i) computer executable instructions executed by at least one processor,
ii) at least one circuitry or
iii) a combination of computer executable instructions executed by at least one processor and at least one circuitry, the control method comprising:

sequentially measuring, by the communication processing unit, a processing time of the communication processing and sequentially outputting delay information indicating the measured processing time to the control unit, sequentially acquiring the delay information from the communication processing unit, and based on the acquired delay information, sequentially updating delay information incorporated in a control algorithm for controlling the target controlled apparatus, and updating the delay information incorporated in the control algorithm when a time obtained by subtracting the processing time measured last time from the processing time measured this time is longer than a predetermined length.

* * * * *